(12) United States Patent
Sauer et al.

(10) Patent No.: US 6,672,612 B2
(45) Date of Patent: Jan. 6, 2004

(54) AIRBAG FOR A MOTOR VEHICLE

(75) Inventors: Frank Sauer, Niedernberg (DE);
Manfred Zerbe, Aschaffenburg (DE);
Markus Gottschalk, Wennigsen (DE)

(73) Assignee: Takata-Petri AG, Aschaffenburg (DE)

( * ) Notice: Subject to any disclaimer, the term of this patent is extended or adjusted under 35 U.S.C. 154(b) by 132 days.

(21) Appl. No.: 09/942,960

(22) Filed: Aug. 31, 2001

(65) Prior Publication Data

US 2002/0027342 A1 Mar. 7, 2002

(30) Foreign Application Priority Data

Sep. 1, 2000 (DE) .......................................... 100 44 049
Nov. 7, 2000 (DE) .......................................... 100 56 081
Jul. 20, 2001 (EP) .............................................. 01250271

(51) Int. Cl.[7] ............................................... B60R 21/22
(52) U.S. Cl. ................................. 280/730.2; 280/743.2
(58) Field of Search ............................... 280/729, 730.2, 280/743.2, 749

(56) References Cited

U.S. PATENT DOCUMENTS

| 6,010,149 A | | 1/2000 | Riedel et al. | |
| 6,152,481 A | * | 11/2000 | Webber et al. | ............ 280/730.2 |
| 6,203,058 B1 | * | 3/2001 | Elqadah et al. | .......... 280/730.2 |
| 6,237,943 B1 | * | 5/2001 | Brown et al. | ............ 280/730.2 |
| 6,290,253 B1 | * | 9/2001 | Tietze et al. | ............. 280/730.2 |
| 6,312,009 B1 | | 11/2001 | Haland et al. | |
| 6,347,807 B1 | * | 2/2002 | Schink et al. | ............ 280/730.2 |
| 6,422,593 B1 | * | 7/2002 | Ryan | ........................ 280/730.2 |
| 2001/0038197 A1 | * | 11/2001 | Herzog | .................... 280/730.2 |
| 2002/0024204 A1 | * | 2/2002 | Fischer | ..................... 280/730.2 |
| 2003/0011175 A1 | * | 1/2003 | Hess et al. | ............... 280/730.2 |

FOREIGN PATENT DOCUMENTS

| DE | 198 16 061 A1 | 10/1998 |
| EP | 0 814 001 B1 | 10/2000 |
| GB | 2 327 066 A | 1/1999 |
| WO | WO 9626087 | 8/1996 |

* cited by examiner

Primary Examiner—Paul N. Dickson
Assistant Examiner—Laura B. Rosenberg
(74) Attorney, Agent, or Firm—Foley & Lardner

(57) ABSTRACT

An airbag for a motor vehicle, with at least one inflatable region which is capable of being inflated by means of a gas generator and in the inflated state forms a lateral curtain for protecting a vehicle occupant. When inflated the airbag is clamped between two points on the vehicle body which are separated from each other in the longitudinal direction of the vehicle. The airbag has a separation region, which may be an opening, that is bridged by a tautening element which is capable of being inflated together with the inflatable region. When the airbag inflates the opening deforms reducing the length of the opening in the longitudinal direction of the vehicle.

27 Claims, 5 Drawing Sheets

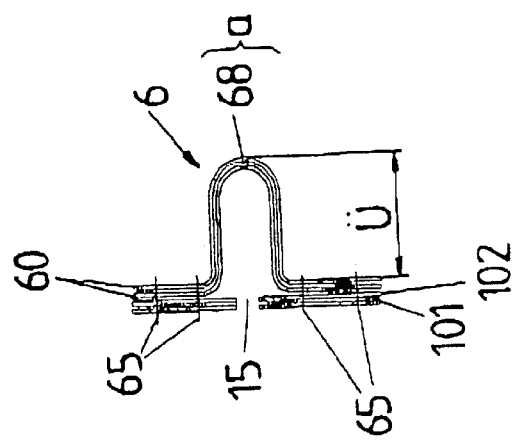
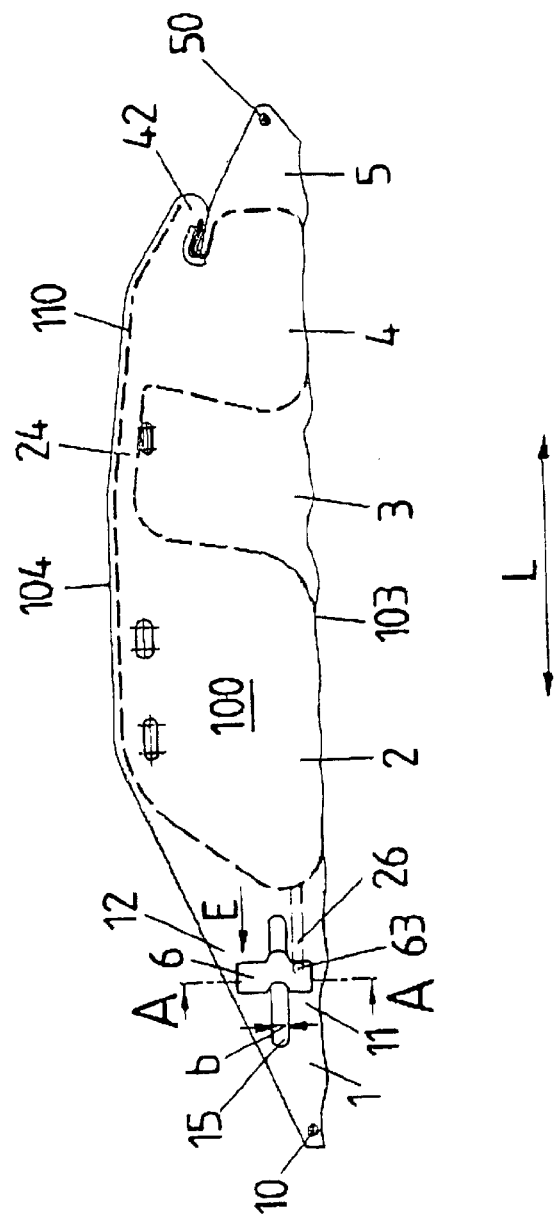

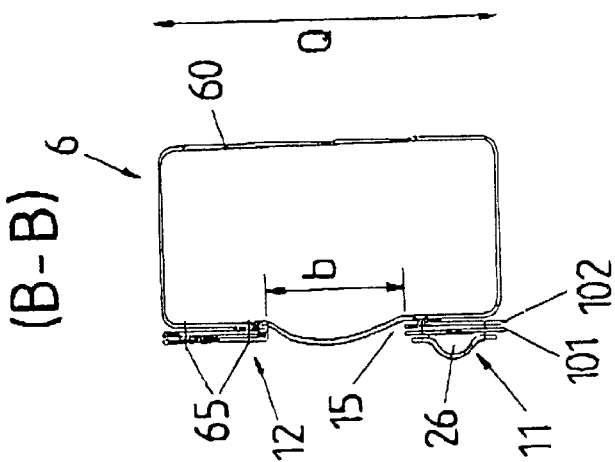
Fig. 2b (B-B)
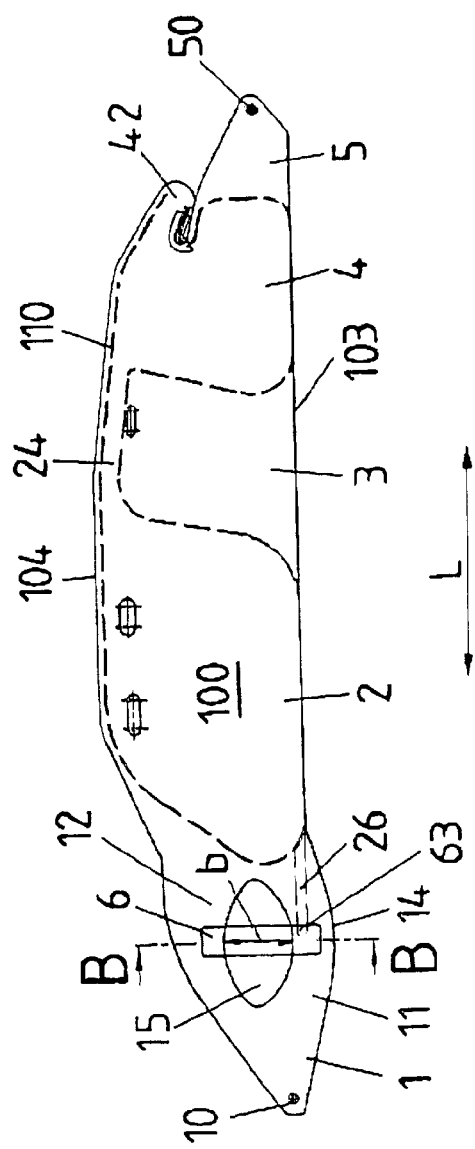
Fig. 2a
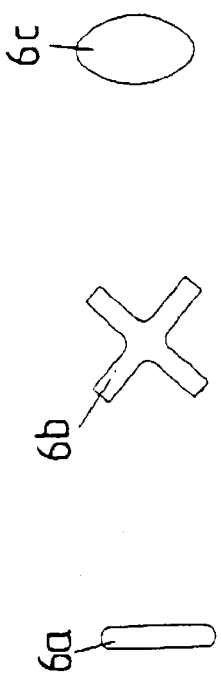
Fig. 3a  Fig. 3b  Fig. 3c

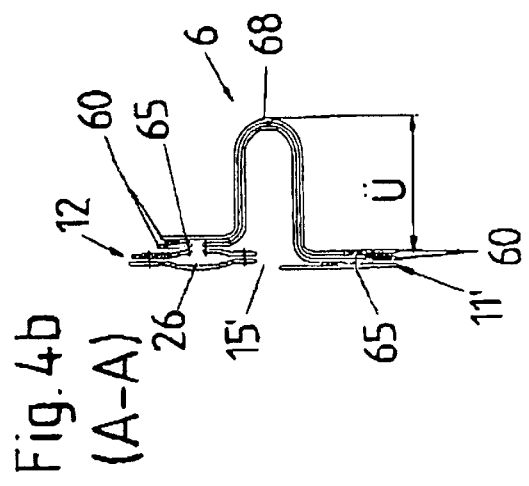
Fig. 4b (A-A)
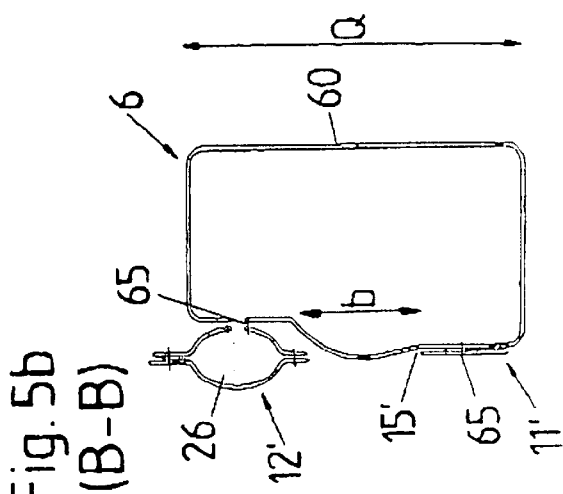
Fig. 5b (B-B)
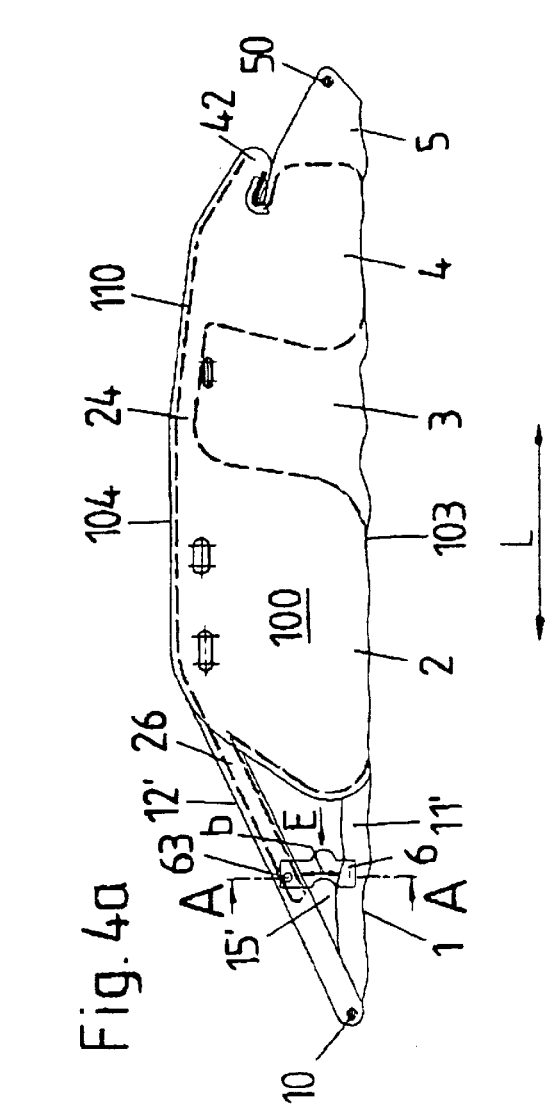
Fig. 4a
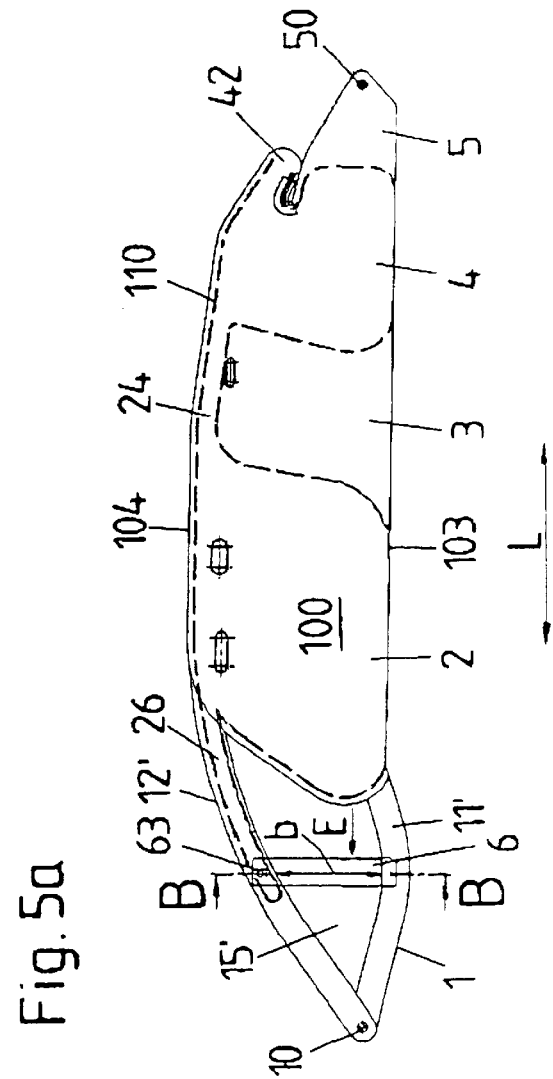
Fig. 5a

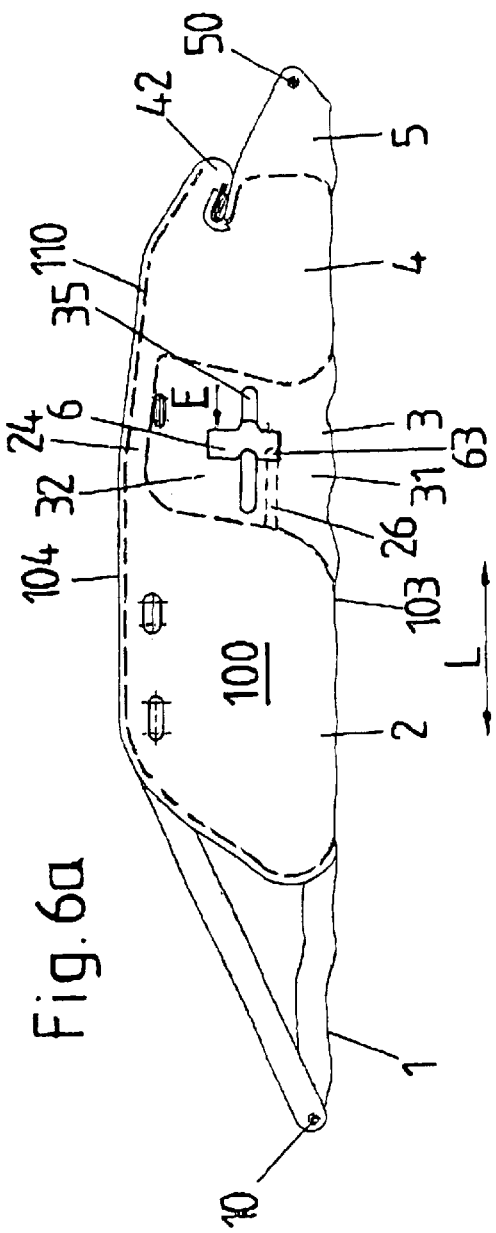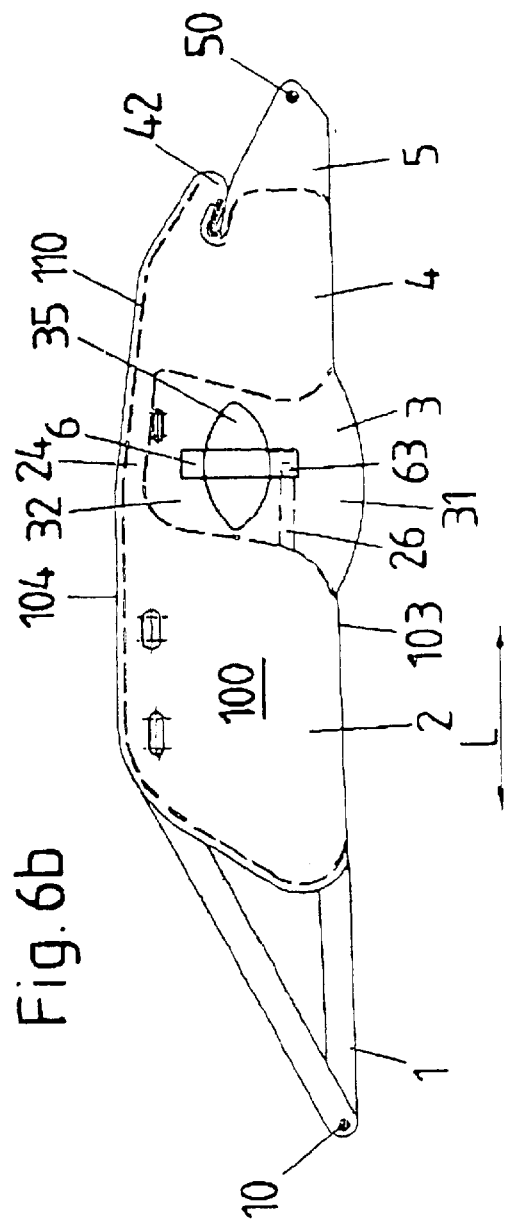

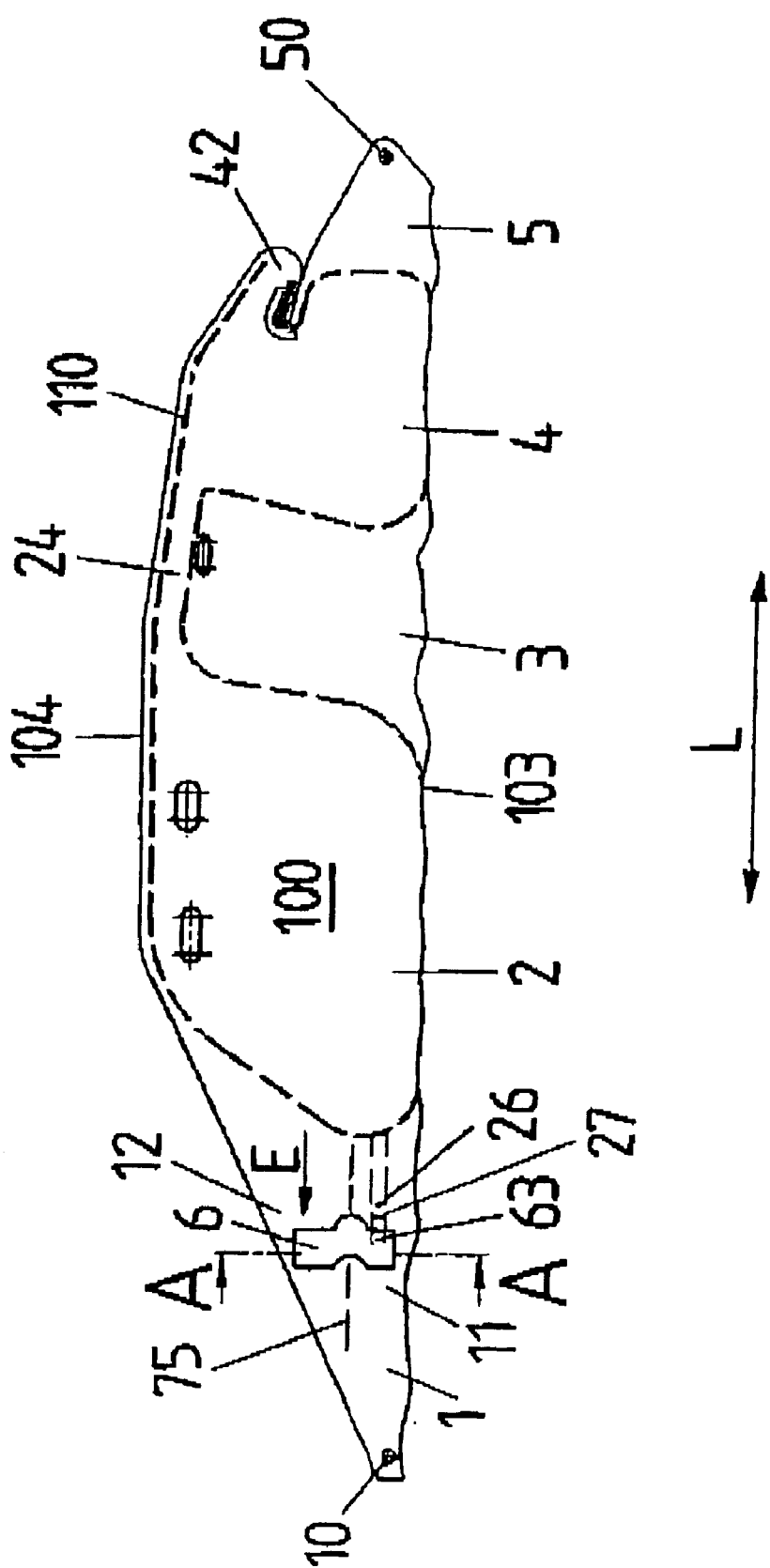

AIRBAG FOR A MOTOR VEHICLE

BACKGROUND OF THE INVENTION

A typical airbag includes at least one inflatable region which is capable of being inflated by means of a gas generator and, in the inflated state, forms in the motor vehicle a lateral curtain for protecting the head and shoulder of an occupant, the airbag being clamped in the inflated state between two points on the vehicle body which are at a distance from one another in the longitudinal direction of the vehicle.

Such airbags are also designated as "curtains" which, in the event of a crash, are discharged in front of the lateral window panes of a motor vehicle, in order to prevent a collision of a vehicle occupant against the window pane or against lateral body parts of the motor vehicle or even to prevent the occupant from being thrown out through a window pane. It is important, for this purpose, that the airbag be tensioned tautly in the region of its lower edge during inflation. This is because only a sufficient tension of the lower edge of the airbag ensures that it can protect a vehicle occupant, particularly in the event of a rollover, against being thrown out through the windows.

It is known from WO 96/26087 and EP 0 814 001 A1 to provide the airbag in its inflatable regions with contractions which extend as far as the lower edge of the inflatable regions and, when these regions are being inflated, cause the effective length of the lower edge to be reduced, with the result that the airbag is tautened in the region of its lower edge.

DE 198 16 061 A1 discloses an airbag for a motor vehicle, comprising an airbag which is designed to be inflated in the event of a crash, in order to form a lateral curtain, the airbag possessing a fastening strip between the curtain and an anchoring point on the body, and the fastening strip containing inflatable means in order to reduce the effective length of the fastening strip during inflation and thereby tauten the airbag.

The object on which the invention is based is to provide an airbag of the type initially mentioned, which makes it possible by simple means to tauten the airbag sufficiently during inflation.

SUMMARY OF THE INVENTION

According to the present invention an airbag for a motor vehicle is provided. The airbag includes an inflatable region configured to be inflated so that when inflated the region forms a lateral curtain for protecting a vehicle occupant. The airbag includes a separation region bridged by a tautening element which is capable of being inflated together with the inflatable region so that when the tautening element inflates the separation region is deformed thereby reducing the length of the opening in the longitudinal direction of the vehicle. The airbag is clamped between two points on the vehicle body which are separated from one another in the longitudinal direction of the vehicle.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 1a shows a side view of an airbag which extends between the A-pillar and the C-pillar of a motor vehicle;

FIG. 1b shows a cross section through the airbag from FIG. 1a in the region of an opening bridged by a loose tautening element;

FIG. 2a shows the airbag from FIG. 1a after inflation in the event of a crash;

FIG. 2b shows a cross section through the airbag from FIG. 2a in the region of the opening bridged by an inflated tautening element;

FIGS. 3a–3c show various modifications of the tautening element from FIGS. 1 and 2;

FIG. 4a shows a side view of a further exemplary embodiment of an airbag which extends between the A-pillar and the C-pillar of a motor vehicle;

FIG. 4b shows a cross section through the airbag from FIG. 4a in the region of an opening bridged by a loose tautening element;

FIG. 5a shows the airbag from FIG. 4a after inflation in the event of a crash;

FIG. 5b shows a cross section through the airbag from FIG. 5a in the region of the opening bridged by an inflated tautening element;

FIG. 6a shows a side view of another exemplary embodiment of an airbag which extends between the A-pillar and the C-pillar of a motor vehicle;

FIG. 6b shows the airbag from FIG. 6a after inflation in the event of a crash.

FIG. 7 shows a side view of a further exemplary embodiment of an airbag having a perforation for the separation region, the airbag extending between the A-pillar and the C-pillar of a motor vehicle;

DETAILED DESCRIPTION

According to the present invention an airbag is provided. The arrangement has, in at least one portion, a separation region, which may be an opening, bridged by a tautening element which is capable of being inflated together with the inflatable region of the airbag, so that the portion provided with the separation region is deformed and the effective length of this portion is thereby reduced in the longitudinal direction of the vehicle.

The invention is based on the knowledge that the action of an inflatable tautening element can be markedly improved with regard to the tautening of the airbag when the tautening element is assigned a separation region in one portion of the airbag. In the surroundings of this separation region, it is possible, during the inflation of the tautening element, to have a particularly pronounced deformation of the airbag, thus entailing a correspondingly pronounced reduction in the effective length of this portion of the airbag and consequently a corresponding tautening of the airbag.

The separation region, when mentioned herein, includes any separation which subdivides a portion of the airbag into two subportions, so that the two subportions can be moved relative to one another (e.g., can be moved away from one another), specifically in a nondestructive way to a greater extent and with less effort than a corresponding portion of the airbag without such a separation. The separation region thus serves for allowing or facilitating a deformation of the airbag during the inflation of the tautening element.

The separation region may be formed by any free space between two subportions of the airbag, for example in the form of a slit or a gap (if the two subportions overlap), or by a noninflatable region of the airbag. If the noninflatable region is used, the region must be configured appropriately in order to allow a deformation of this region during the inflation of the tautening element. For this purpose, the separation region may have a weakened portion, for example, in the form of a perforation which tears during the inflation of the tautening element, or at least one fold which extends preferably transversely to the tautening element and which is canceled, during the inflation of the tautening element, as a result of the tautening of the element.

The separation region and the associated tautening element are to be arranged in such a way that tautening of the airbag in the region of its lower edge takes place. By contrast, a tautening of the upper edge of the airbag is, as a rule, of lesser importance, since the airbag is secured along its upper edge to the vehicle body to the roof edge.

The separation region may, in principle, be provided at any point of the airbag. It is not necessary for the separation region to be formed on the airbag itself; it may, for example, also run between two bands, by means of which the airbag is fastened to the vehicle body. This also means that the separation region does not have to be integrated into a one-part portion of the airbag. Instead, the separation region may also be provided between two different parts of the arrangement, such as, for example, between two of the abovementioned bands, as shown in FIG. 4a.

The separation region extends in one portion of the airbag preferably in such a way that the direction of extent of the separation region has at least one component in the longitudinal direction of the vehicle, and the tautening element bridges the separation region transversely to the direction of extent of the separation region or runs transversely to the longitudinal direction of the vehicle.

The tautening element may be fastened in a simple way, as a separate element, to that portion of the airbag which is provided with the separation region, the tautening element lying loosely over the separation region in the uninflated state and being tautened during inflation, with the result that the width of the separation region (that is to say its expanse transversely to its direction of extent) increases. By virtue of the change in width of the separation region brought about during the inflation of the tautening element, a deformation of the airbag is at the same time also caused in the region of the portion provided with the separation region. As a result, the lower edge of the portion provided with the separation region arches, and the effective length of this portion in the longitudinal direction of the vehicle is reduced.

The uninflated tautening element therefore has, between the fastening points on both sides of the separation region, a length which is greater than the distance between the fastening points of the loosely spread-out uninflated airbag, and, as a result of the inflation of the tautening element, the distance between its fastening points on both sides of the separation region is increased, thus leading to the desired increase in width in the separation region.

The fastening of the tautening element on both sides of the separation region is carried out preferably by means of seams.

It is advantageous if the separation region is provided in a noninflatable portion of the airbag. Thus, the separation region may be provided in a fastening portion of the airbag, the fastening portion extending from an inflatable region of the airbag to a part of the vehicle body and being fastened there. On the other hand, the separation region may also be provided on a portion of the airbag which extends between two inflatable regions of the airbag. By the separation region being arranged in this way outside the inflatable regions of the airbag, the configuration of the inflatable regions can be freely optimized in terms of ensuring the best possible collision protection, without the integration of means for tautening the airbag having to be taken into account in the configuration of the inflatable regions.

The separation region runs transversely to the plane of extent of the associated portion of the airbag, preferably continuously, so that this portion is subdivided into two subportions by the separation region.

The tautening element may be inflated in a simple way with gases from the same gas generator which also serves for inflating the at least one inflatable region of the airbag. There may be a direct connection between the tautening element and the gas generator, for example in that the gases are fed to the tautening element directly from a gas lance serving for inflating the airbag, or gases are transferred from an inflatable region of the airbag to the tautening element. The inflatable portion of the airbag and tautening element may be fluidly connected directly or through the gas lance. Alternatively, a separate pressure generation device may, of course, also be provided for inflating the tautening element.

The tautening element consists preferably of a material impermeable to the gases used, so that the inflated state of the tautening element and therefore the tautened state of the airbag as a whole can be maintained for as long as possible.

For this purpose, means may also be provided (for example in the form of a diaphragm arranged in the inflow region of the tautening element), which, after the inflation of the tautening element, prevent the gases from flowing out of the tautening element.

The airbag according to the invention may consist in a simple way of two plies, preferably, fabric plies, stitched to one another, the inflatable regions and the noninflatable portions of the airbag being defined by the run of the seams. Such an airbag may extend along the entire lateral vehicle body from the A-pillar to the C-pillar, the airbag being fixed at at least one point in the region of the A-pillar and at least one point of the C-pillar. The airbag may, however, also be provided only for covering part of the lateral vehicle body, for example the A-pillar and B-pillar portion or the portion between the B-pillar and C-pillar.

FIG. 1a shows a view of an airbag 100, spread out flat, which is capable of being stowed in the lateral roof edge region of a motor vehicle and is provided for forming a lateral curtain in the event of a crash. The airbag 100 forms an essential integral part of an airbag arrangement which, in addition to the airbag 100, also comprises further elements, such as, for example, a gas generator, gas lance and the like.

The airbag 100 is formed by two fabric plies 101, 102, of which one fabric ply 101 faces the lateral vehicle body and the fabric ply 102 faces the vehicle interior when the airbag is discharged as a curtain in a motor vehicle. The two fabric plies 101, 102 are stitched to one another via a seam 110, specifically in such a way as to form in the airbag 100 two inflatable regions 2, 4 and also noninflatable front and rear fastening portions 1, 5 and a middle portion 3 connecting the two inflatable regions 2, 4 to one another.

The upper edge 104 of the airbag 100 is matched in shape to the run of the roof edge region of the vehicle in which the airbag 100 is to be arranged. By contrast, the lower edge 103 of the airbag runs essentially in a straight line between the front end of the front fastening portion 1 and the rear end of the rear fastening portion 5 of the airbag 100. Fastening points 10 and 50 are provided on the front and rear fastening portions 1, 5. The fastening points serve for fastening the front fastening portion 1 in the region of the A-pillar and the rear fastening portion 5 in the region of the B-pillar of the vehicle.

The two inflatable regions 2, 4 of the airbag are connected to one another via a duct 24. A gas lance can be led through this duct 24 in a known way and be introduced through an orifice 42 into the airbag 100, the gas lance extending along the entire roof edge region of the two inflatable regions 2, 4. By means of this gas lance, when the gas generator is activated in the event of a crash, the gas provided for inflating the airbag can flow out of a gas generator into the two inflatable regions 2, 4.

It also becomes clear from FIG. 1a, with additional reference to the cross section in FIG. 1b, that an opening in the form of a slit extends in a direction E parallel to the longitudinal direction L of the vehicle in the front fastening portion 1 of the airbag 100. This slit 15 runs continuously, transversely to the plane of extent of the fastening portion 1. The slit 15 completely intersects the two fabric plies 101, 102 in the front fastening portion 1 and thereby divides the portion 1 into a lower subportion 11 and an upper subportion 12.

The slit 15, having a given width b (expanse transversely to the direction of extent E of the separation region 15), is bridged by a tautening element 6 which consists of a cut-to-size fabric piece 60 that is stitched on both sides of the slit 15 to the fabric plies 101, 102 of the airbag 100 at fastening points 65 (seams). When the airbag is in the state illustrated in FIGS. 1a and 1b, in which it is spread out flat, the tautening element 6 lies loosely on the slit 15 and at the same time forms a fold 68.

The length $2*\ddot{U}$ of the projecting material of the tautening element 6, which runs loosely over the slit 15, is freely selectable. By selecting the length $\ddot{U}$ the tautening action of the tautening element 6 can be set, as will also be shown below.

In other words, when the empty airbag is in the spread-out state shown in FIGS. 1a and 1b, the distance (a) between the fastening points 65 on both sides of the slit 15 is considerably smaller than the length $(a+2*\ddot{U})$ of the tautening element 6 between the two fastening points 65.

FIG. 1a shows, furthermore, that a gas feedline 26 extends between the front inflatable region 2 of the airbag 100 and the tautening element 6. Gas fed to the inflatable region 2 can be led further into the tautening element 6 through the feedline 26.

The airbag illustrated in FIGS. 1a and 1b, when folded together to form an elongate package, is stowed in the roof edge region of a vehicle. In the event of a crash, this airbag is discharged, sensor-controlled, as a lateral curtain in front of the side windows and other lateral body parts of the vehicle and is simultaneously inflated. The two inflatable regions 2, 4 of the airbag 100 then form lateral collision protection for vehicle occupants, the front inflatable region 2 being assigned to a vehicle occupant located in the front seat and the rear inflatable region 4 being assigned to an occupant located in a backseat. The front inflatable region 2 thus extends in front of a front side window and the rear inflatable region 4 in front of a rear side window of the vehicle. Furthermore, lateral body parts are also capable of being covered relative to the interior by means of the inflatable regions 2, 4, in order to prevent an occupant from colliding, for example, with the B-pillar.

During the inflation of the inflatable regions 2, 4 of the airbag 100, gas is transferred from the front inflatable region 2 to the tautening element 6 via the gas feedline 26. As can be seen from FIG. 2b, the gas feedline 26 is formed by a fabric portion stitched to the fabric plies 101, 102 of the airbag 100. As a result, when the two regions 2, 4 of the airbag 100 are being inflated, the tautening element 6 is also at the same time inflated by the gases flowing out of the gas generator of the airbag.

During inflation, the tautening element 6 is tautened and its length Q increases transversely to the direction of extent E of the slit 15. The width b of the slit 15, which is bridged by the tautening element 6, consequently increases. (The distance between the fastening points 65 on both sides of the slit 15 then corresponds to the length of the inflated tautening element 6 between the fastening points 65.) The change in width b of the slit 15 results, in turn, in a deformation of the fastening portion 1 in the region of the slit 15. As a result, the subportions 11, 12 of the fastening portion 1 which are formed on both sides of the slit 15 are deformed. This leads to an arching of the fastening portion 1 in the region of the lower edge 103 of the airbag 100, and, as a result of the arching 14 in the region of the lower edge of the fastening portion 1, the effective length of the fastening portion 1 in the longitudinal direction L of the vehicle is reduced. This results in the tautening of the airbag 100 along its lower edge 103.

As shown in FIG. 7, a diaphragm 27 may be arranged behind the inflow region 63 of the tautening element 6. The diaphragm 27 has a nonreturn function to ensure that the gases which have flowed into the tautening element 6 through the inflow region 63 during inflation do not flow out again when the airbag 100 becomes slack. As a result, the tension of the lower edge 103 of the airbag 100 can be maintained for a correspondingly long period of time.

The amount that the width b of the slit 15 increases during the inflation of the airbag 100 is limited by the length $2*\ddot{U}$ of that portion of the tautening element 6 which lies loosely over the separation region in the noninflated state and is put into a fold 68. This results because this length $2*\ddot{U}$ at the same time determines the length of the tautening element 6 in the direction Q transverse to the direction of extent E of the separation region 15 after inflation. This length, in turn, defines the width b of the separation region 15 after inflation of the tautening element 6.

The greater the increase in width b of the slit 15 during the inflation of the tautening element 6, the more the front fastening portion 1 is arched in the region of its lower edge and the more the lower edge 103 of the airbag 100 is tautened or tensioned in the longitudinal direction L.

The separation region (slit 15) and the associated tautening element 6 may, be arranged at any desired point on the airbag 100. Arrangement in one of the noninflatable portions 1, 3, 5 is preferred. At the same time, arrangement in the middle portion 3, which is located between the two inflatable regions 2, 4, affords the advantage of a symmetric position of the separation region between the front and the rear end of the airbag.

Moreover, a plurality of separation regions or openings may, of course, also be provided for particularly strong tautening, that is to say, for example, separation regions both in the front and in the rear fastening portion 1, 5 and also in the middle portion 3.

The tautening element 6 illustrated in FIGS. 1 and 2 has, in plan view, an essentially rectangular design. A multiplicity of further shapes, by means of which the function of the tautening element can be fulfilled, may be envisaged. Some further shapes of a suitable tautening element 6a, 6b and 6c, to be precise two oval shapes and one crossed shape, are shown by way of example in FIGS. 3a to 3c. In principle, any shape making it possible to bridge an opening in the airbag may be used for the tautening element. The tautening element must be capable of being tautened by inflation and of being varied in its effective length transversely to the direction of extent of the separation region.

A further exemplary embodiment of an airbag according to the invention, illustrated in FIGS. 4a to 5b, differs from the exemplary embodiment illustrated in FIGS. 1a to 2b in the design of the separation region and in the arrangement of the gas feedline. The two exemplary embodiments are otherwise identical. This is expressed by the use of identical reference symbols in the two exemplary embodiments. The following description of FIGS. 4a to 5b is restricted to those parts of the airbag which are modified in relation to the first exemplary embodiment. The description relating to FIGS. 1a to 2b otherwise applies correspondingly.

According to FIGS. 4a to 5b, the opening 15' is formed by a free space or slit which extends between two separate parts of the airbag, to be precise between two bands 11', 12' which serve for fastening the airbag to the A-pillar of a motor vehicle and correspondingly converge at a fastening point 10. One of the bands runs as a lower band 11' between the fastening point 10 and the lower edge 103 of the airbag and the other runs as an upper band 12' between the fastening point 10 and the upper edge 104 of the airbag. The two bands 11', 12' are each stitched to the airbag 100 and between them form a free space or slit 15' which is bridged by a tautening element 6. The bands 11', 12' together form the front fastening portion 1 of the airbag.

The second difference from the previous exemplary embodiment is that, as shown in FIG. 4a, the gas feedline 26 runs along the upper subportion of the fastening portion 1 (upper band 12') to the tautening element 6. The gas can therefore be fed directly to the gas feedline 26 from a gas lance which extends along the upper edge 104 of the airbag 100 and, in the installed state, is arranged in the roof edge region of the corresponding vehicle.

The embodiment shown in FIGS. 4 and 5 corresponds in its functioning to the airbag previously described in detail. When the airbag 100 is being inflated, the tautening element 6 is also inflated simultaneously (by means of the gases flowing through the gas feedline 26), thus leading to a widening of the free space or slit 15' between the two bands 11', 12'. These bands 11', 12' are arched, thus leading to a reduction in their effective length in the longitudinal direction L of the vehicle and therefore resulting in a tautening of the lower edge 103 of the airbag.

FIGS. 6a and 6b illustrate an exemplary embodiment of an airbag, in which an opening in the form of a slit 35 and an associated tautening element 6 are located in a middle portion 3 of the airbag 100. The middle portion 3 positioned to connect the two inflatable portions 2, 4 to one another.

The noninflatable middle portion 3 of the airbag 100 is separated into two subportions 31, 32 by the slit 35 in a corresponding way to the front fastening portion 1 of the airbag in the exemplary embodiment shown in FIGS. 1a to 2b. Accordingly, during the inflation of the airbag illustrated in FIG. 6a, arching of the lower subportion 31 occurs, as a result of which the effective length of the lower edge 103 is reduced and the airbag 100 is therefore tautened in the region of its lower edge 103.

In the exemplary embodiments described above, another of the different type of separation regions mentioned above may be employed. For example, as shown in FIG. 7 a perforation 75, may also be used instead of an opening in the form of a slit or free space.

By virtue of the inflation of a tautening element, it is possible, in addition to the lower edge of the airbag being tautened, also to ensure that the airbag is deployed more uniformly in the event of a crash.

Problems in this regard may arise, for example, due to the stowage space for the folded airbag (in the roof edge region of a vehicle) having a different geometry from that of the natural shape of the folded airbag. If, in the event of a crash, the gas provided for inflating the airbag is admitted into the airbag from above (as illustrated in FIGS. 1a to 6b), the upper portions of the airbag are inflated first. As a result, when the shape of the folded airbag (which of course is also subject to boundary conditions other than that of matching the geometry of the stowage space) does not match exactly to the geometry of the stowage space, it is possible that the lower portions of the airbag are pressed sideways out of their original position and, thus, deploy with an additional delay in relation to the upper portions.

This problem is overcome by the arrangement of present invention, because, during the inflation of the tautening element provided in FIGS. 1a to 6b, the lower portions of the airbag are positioned at an early stage in such a way that they are deployed along the vertical vehicle axis (transversely to the longitudinal direction of the vehicle) out of the stowage space in the roof edge region and in front of the side windows of the corresponding motor vehicle.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

The priority documents, German patent applications nos. 100 44 049.5 and 100 56 081.4 and European patent application no. 0125027.2, are incorporated by reference herein in their entirety.

What is claimed is:

1. An airbag for a motor vehicle comprising:
   an inflatable region configured to be inflated so that when inflated the region forms a lateral curtain for protecting a vehicle occupant;
   a separation region bridged by a tautening element which is capable of being inflated together with the inflatable region so that when the tautening element inflates the separation region is deformed thereby reducing the length of the region in the longitudinal direction of the vehicle;
   wherein the airbag is clamped between two points on the vehicle body which are separated from one another in the longitudinal direction of the vehicle; and
   wherein the tautening element is fastened to the airbag on two sides of the separation region.

2. The airbag of claim 1, wherein the separation region includes an opening.

3. The airbag of claim 2, wherein the opening includes a component extending in the longitudinal direction of the vehicle.

4. The airbag of claim 3, wherein the opening extends essentially in the longitudinal direction of the vehicle.

5. The airbag of claim 2, wherein the tautening element bridges the opening transversely to the direction that the opening extends in.

6. The airbag of claim 2, wherein the tautening element lies loosely over the opening in the uninflated state and is tautened during inflation, with the result that the width of the opening increases.

7. The airbag of claim 2, wherein the opening is provided in a noninflatable portion of the airbag.

8. The airbag of claim 2, wherein the opening is provided in a fastening portion, wherein the airbag is adapted to be connected to the vehicle body by the fastening portion.

9. The airbag of claim 2, wherein the opening extends completely through the airbag.

10. The airbag of claim 2, wherein the opening includes free space surrounded by separate portions of the airbag.

11. The airbag of claim 2, wherein the opening is located in a noninflatable region of the airbag.

12. The airbag of claim 1, wherein the tautening element is fastened as a separate element to one portion of the airbag.

13. The airbag of claim 1, wherein the tautening element is configured so that prior to inflation the tautening element has, between the fastening points on both sides of the separation region, a length which is greater than a straight line distance between the fastening points of the spread-out uninflated airbag, and wherein, during the inflation of the tautening element, the distance between the fastening points increases.

14. The airbag of claim 13, wherein the separation region includes a length and width, and wherein the width increases when the tautening element inflates.

15. The airbag of claim 12, wherein the tautening element is fastened on opposite sides of the separation region to the one portion of the airbag which includes the separation region.

16. The airbag of claim 12, wherein the tautening element is stitched to the one portion of the airbag which includes the separation region.

17. The airbag of claim 1, wherein the tautening element is fluidly connected to the inflatable region.

18. The airbag of claim 17, wherein the tautening element is positioned so that gas is capable of being fed to the tautening element from the inflatable region of the airbag.

19. The airbag of claim 1, wherein the tautening element consists of gas-impermeable material.

20. The airbag of claim 1, further comprising a means for preventing gas from escaping from the tautening element.

21. The airbag of claim 20, the means includes a diaphragm arranged in the region of a gas inlet orifice of the tautening element, wherein the diaphragm prevents the gas from flowing out of the tautening element through the orifice.

22. The airbag of claim 1, wherein the inflatable region is adapted to extend along the lateral roof edge region of a motor vehicle.

23. The airbag of claim 1, wherein the airbag includes a pair of straps.

24. The airbag of claim 23, wherein the separation region is located between the pair of straps.

25. The airbag of claim 24, wherein the tautening element spans the separation region and is connected to both of the pair of straps.

26. An airbag a motor vehicle comprising:
two inflatable regions configured to be inflated so that when inflated the regions form a lateral curtain for protecting a vehicle occupant;
an opening bridged by a tautening element which is capable of being inflated together with the inflatable regions so that when the tautening element inflates the opening is deformed thereby reducing the length of the regions in the longitudinal direction of the vehicle;
wherein the airbag is clamped between two points on the vehicle body which are separated from one another in the longitudinal direction of the vehicle;
wherein the opening is provided in a portion of the airbag which extends between the two inflatable regions of the airbag.

27. An airbag for a motor vehicle comprising:
an inflatable region configured to be inflated so that when inflated the region forms a lateral curtain for protecting a vehicle occupant;
a separation region bridged by a tautening element which is capable of being inflated together with the inflatable region so that when the tautening element inflates the separation region is deformed thereby reducing the length of the region in the longitudinal direction of the vehicle;
wherein the airbag is clamped between two points on the vehicle body which are separated from one another in the longitudinal direction of the vehicle; and
wherein the separation region is formed by a perforation in the airbag.

* * * * *